May 5, 1959 H. H. KING 2,885,648
TEST PROBE WITH RETRACTIBLE SHIELD
Filed Dec. 6, 1956

INVENTOR.
HERBERT H. KING
BY Walter S. Pawl
ATTORNEY

2,885,648
TEST PROBE WITH RETRACTIBLE SHIELD

Herbert H. King, Rockville, Md.

Application December 6, 1956, Serial No. 626,705

2 Claims. (Cl. 339—36)

The present invention relates to test terminals or potential supply terminals having contact probes, and which are used in connection with testing instruments for testing the potential or resistance of circuits across points contacted by these probes, or in connection with the supply of potential from a source.

The main object of this invention is to provide protection for or from these terminal probes, whether in use or not in use, against accidental contact with grounded or highly charged conductors which might be exposed nearby.

A further object is to provide a terminal probe with a cylindrical terminal holder having an insulated slidably extensible sleeve over the end of said probe and resilient means in said holder normally biasing said sleeve to its extended position.

A further object is to devise a simple and sturdy construction for the above terminal assembly which is easily assembled.

Figure 1:
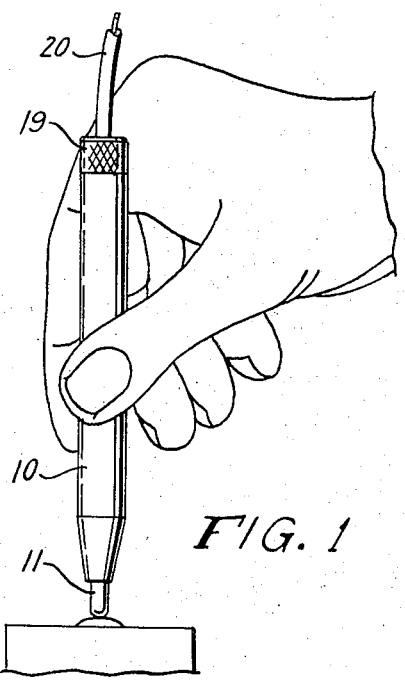
Figure 3:
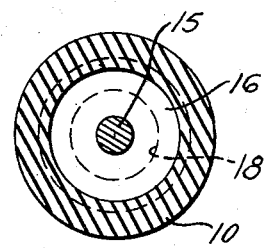
Figure 4:
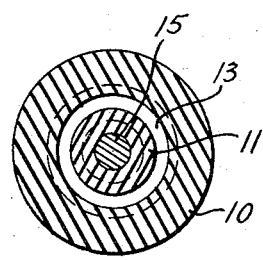
Figures 2, 5:
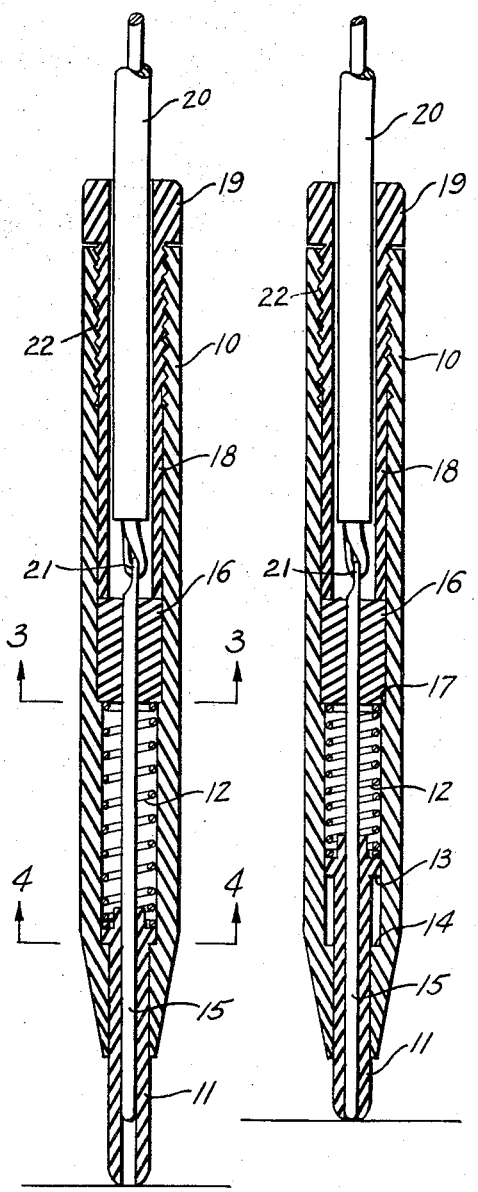

Other and more specific objects will appear in the following detailed description of a preferred form of the invention, as illustrated in the accompanying drawing, wherein:

Fig. 1 is a perspective view of one of the novel test terminals held against an exposed contact, Fig. 2 is an axial sectional view of the terminal showing the novel structure of the recessed spring and protector sleeve, Figs. 3 and 4 are cross-sectional views taken on the lines 3—3 and 4—4 respectively of Fig. 2, and Fig. 5 is a sectional view similar to Fig. 2, but showing the terminal holder pressed against a contact surface to push the protector sleeve in and bring the end of the probe against the surface.

The preferred form of the invention as illustrated comprises the holder sleeve 10, which is cylindrical externally and of suitable size to be readily gripped and held between the thumb and fingers of the operator's hand. Its outer end may be tapered down to substantially the diameter of the extendable end sleeve 11. Sleeve 11 is biased outwardly by spring 12 which normally holds the sleeve 11 in extended position by pressing the external shoulder 13 of the sleeve 11 outwardly against the internal shoulder 14 in the bore of sleeve 10.

In its normally extended position the sleeve 11, which is of insulating material, provides a shield for the probe 15, and protects it against accidental contact with conductive materials on the bench either while testing or when not in use. The spring 12 is held compressed in the assembly by means of collar member 16 in which the probe 15 is fixedly mounted, and which is held outwardly against another internal shoulder 17 in the sleeve 10, by means of cap sleeve 18, which is externally threaded at 22 and screwed into place in the internally threaded end of the sleeve 10. The cap or head 19 of the cap sleeve 18 may be knurled to facilitate manual screwing during assembly and dissembly. The collar member 16, the cap sleeve 18 and the holder sleeve 10 are of insulating material.

Thus it may be seen that in attaching this holder combination to a wire terminal 20, the cap sleeve 18 is first slipped over the end of the wire, the insulation is removed to expose a short piece of bare wire which is attached to the eye 21 at the inner end of the probe 15. For this purpose this end of the probe may be provided with a loop through which the wire is passed and then twisted, or it may be more permanently attached thereto by soldering. Then the probe assembly is inserted into the holder 10 into which the sleeve 11 and spring 12 are first inserted as shown in the assembly illustrated. Then the cap sleeve 18 is slid down to the holder and inserted far enough to start its thread into the threaded end of the holder 10, whereupon the cap sleeve is manually screwed into place against the collar 16, compressing the spring 12 until the collar 16 rests firmly on the internal shoulder 17 of sleeve 10. The sleeve 11 will normally be biased into extended position in the holder by the spring 12, to protect the probe 15 against accidentally touching any conductor which may detrimentally affect the testing circuit or the conductor circuit or both.

To make a contact with any conductor, it is necessary for the operator merely to press the end of the sleeve 11 against the conductor until the outer end of the probe 15 is brought into contact with the conductor. As soon as the operator releases the pressure, spring 12 again extends the sleeve 11 beyond the end of the probe to maintain its protection against accidental contacts.

It is obvious, for example, to provide a short protector sleeve portion, such as described, at right angles to a holder portion for use in reaching into openings when contacting some contacts on a side wall therein.

Furthermore, besides the use of these holders for test probes, they may obviously also be used for hot terminal probes used for temporarily supplying current to circuits by contacting the terminals of such circuits with these probes, which in this case would be connected to a source of potential.

The parts, being simple in form, are easily made and assembled, and require no adjustment. However, many obvious modifications may be made in the details without departing from the spirit and scope of this invention, as defined in the appended claims.

What is claimed is:

1. A streamlined test probe and holder for connection to a test wire terminal comprising a holder sleeve bored from one end to three different size bores extending through successive portions of said holder sleeve to form two internal shoulders between said portions, said one end being internally threaded, the other end being externally tapered, an insulator sleeve extending slidably through the small bore in said tapered end and having an external shoulder at its inner end for cooperation with the smaller of said two internal shoulders, an insulator plug slidably fitting in the largest of said bores through said internally threaded end and having a probe fixed centrally therein for slidable extension through said insulator sleeve, the inner end of said probe being adapted for connection to the end of a test wire, an insulator sleeve having an external thread at its outer end to fit said internally threaded end for locking said plug down against the larger internal shoulder, said last named insulator sleeve having a pierced cap at its outer end for said test wire, and a coiled spring in said middle bore between said plug and said first named insulator sleeve to normally bias the latter outwardly against said smaller shoulder to cover the outer end of said probe.

2. A test probe holder as defined in claim 1, said holder sleeve being of insulator material.

References Cited in the file of this patent

UNITED STATES PATENTS

| | | |
|---|---|---|
| 1,255,824 | Shoenberg et al. | Feb. 5, 1918 |
| 2,253,593 | Warren | Aug. 26, 1941 |
| 2,438,350 | Reichard | Mar. 23, 1948 |
| 2,457,506 | Sorensen | Dec. 28, 1948 |
| 2,634,349 | Genter | Apr. 7, 1953 |

FOREIGN PATENTS

| | | |
|---|---|---|
| 295,939 | Italy | Jan. 28, 1931 |